US010936528B2

(12) United States Patent
Dube et al.

(10) Patent No.: US 10,936,528 B2
(45) Date of Patent: Mar. 2, 2021

(54) SYSTEM AND METHOD FOR PROVIDING KEYBOARD, VIDEO, AND MOUSE FUNCTIONALITY

(71) Applicant: Dell Products, LP, Round Rock, TX (US)

(72) Inventors: Shawn J. Dube, Austin, TX (US); Timothy M. Lambert, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 819 days.

(21) Appl. No.: 14/658,744

(22) Filed: Mar. 16, 2015

(65) Prior Publication Data
US 2016/0275037 A1    Sep. 22, 2016

(51) Int. Cl.
| | |
|---|---|
| G06F 13/16 | (2006.01) |
| G06F 13/00 | (2006.01) |
| G06G 5/00 | (2006.01) |
| H04L 12/66 | (2006.01) |
| G06F 13/42 | (2006.01) |
| G06F 13/38 | (2006.01) |
| H04L 29/06 | (2006.01) |
| H04L 29/08 | (2006.01) |

(52) U.S. Cl.
CPC ...... *G06F 13/4282* (2013.01); *G06F 13/1673* (2013.01); *G06F 13/385* (2013.01); *H04L 65/602* (2013.01); *H04L 67/10* (2013.01)

(58) Field of Classification Search
None
See application file for complete search history.

(56) References Cited

U.S. PATENT DOCUMENTS

| | | | |
|---|---|---|---|
| 8,547,993 B1* | 10/2013 | Garlick | G06F 13/4226 370/419 |
| 8,694,693 B2 | 4/2014 | Lambert et al. | |
| 2005/0105608 A1* | 5/2005 | Coleman | G06F 3/1454 375/240.01 |
| 2005/0108451 A1* | 5/2005 | Covington | G06F 3/023 710/62 |
| 2007/0038939 A1* | 2/2007 | Challen | G05B 15/02 715/734 |

(Continued)

OTHER PUBLICATIONS

Jiang, Simon, The Best SoC Solution with AndesCore and Andes's Platform, Andes Technology Corporation, Hsin-Chu, Taiwain, (Year: 2012).*

(Continued)

*Primary Examiner* — Nicholas R Taylor
*Assistant Examiner* — Ho T Shiu
(74) *Attorney, Agent, or Firm* — Larson Newman, LLP (57) ABSTRACT

A method and information handling system utilize an enclosure controller connected to a plurality of server modules. The enclosure controller has an enclosure controller processor for obtaining server module video data from a server module of the plurality of server modules. The enclosure controller provides the server module video data for display. At least one parameter of the server module video data is modified to simplify processing of the server module video data in response to detection of an excessive processing burden of the enclosure controller processor.

20 Claims, 5 Drawing Sheets

(56) References Cited

U.S. PATENT DOCUMENTS

| | | | | |
|---|---|---|---|---|
| 2010/0194676 A1* | 8/2010 | Nakano | ............... | G09G 5/006 |
| | | | | 345/156 |
| 2013/0265328 A1* | 10/2013 | Lambert | ............ | G06F 11/321 |
| | | | | 345/629 |
| 2014/0002361 A1* | 1/2014 | Ballard | ............... | G09G 5/12 |
| | | | | 345/163 |
| 2014/0189187 A1* | 7/2014 | Acharya | ............ | G06F 13/385 |
| | | | | 710/310 |
| 2014/0289433 A1* | 9/2014 | Soffer | ............... | G06F 3/023 |
| | | | | 710/74 |

OTHER PUBLICATIONS

U.S. Appl. No. 14/483,694, filed Sep. 11, 2014 (Ref. No. 103700).

* cited by examiner

SYSTEM AND METHOD FOR PROVIDING KEYBOARD, VIDEO, AND MOUSE FUNCTIONALITY

FIELD OF THE DISCLOSURE

The present disclosure generally relates to information handling systems, and more particularly relates to keyboard, video, and mouse (KVM) functionality for information handling systems.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

Server systems are typically installed with several server modules at a site. If the server modules are working properly, the need to monitor them locally may be diminished or nonexistent. Thus, it is feasible to use one keyboard, video, and mouse (KVM) to interact with a selected one of the several server modules. With an appropriate configuration, the KVM capability can be shared among the several server modules such that the KVM capability can be used with one server module at a time. Previous modular servers had some level of hardware dedicated to local keyboard, video, and mouse (KVM) capability, such as universal serial bus (USB) multiplexers (MUXes), USB hubs, USB redrivers, VGA MUXes, VGA switches, VGA redrivers, and programmable logic.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
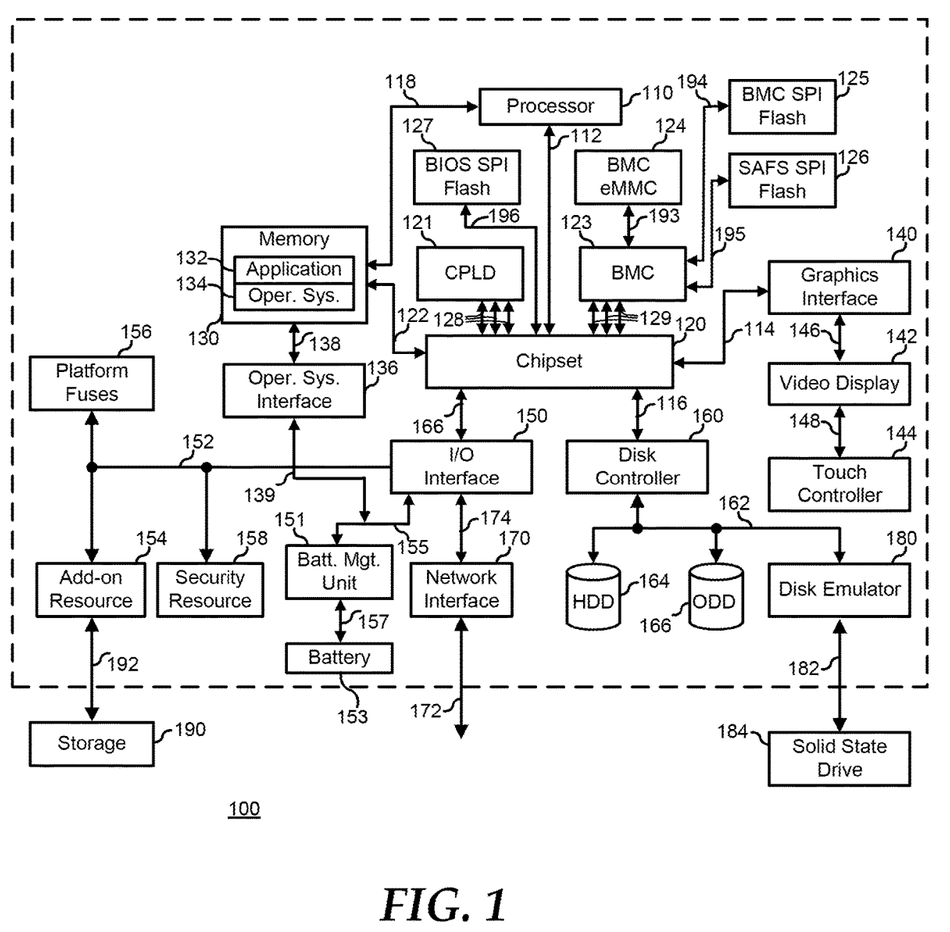
FIG. 1 is a block diagram illustrating an information handling system according to an embodiment of the present disclosure.

FIG. 1 illustrates a generalized embodiment of information handling system 100. For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described above, and operates to perform one or more of the methods described above. Information handling system 100 includes a processor 110, a chipset 120, a memory 130, a graphics interface 140, a disk controller 160, a disk emulator 180, an input/output (I/O) interface 150, and a network interface 170. Processor 110 is connected to chipset 120 via processor interface 112. Processor 110 is connected to memory 130 via memory bus 118. Memory 130 is connected to chipset 120 via a memory bus 122. Graphics interface 140 is connected to chipset 120 via a graphics interface 114, and provides a video display output 146 to a video display 142. Video display 142 is connected to touch controller 144 via touch controller interface 148. In a particular embodiment, information handling system 100 includes separate memories that are dedicated to processor 110 via separate memory interfaces. An example of memory 130 includes random access memory (RAM) such as static RAM (SRAM), dynamic RAM (DRAM), non-volatile RAM (NV-RAM), or the like, read only memory (ROM), another type of memory, or a combination thereof. Memory 130 can store, for example, at least one application 132 and operating system 134. Operating system 134 includes operating system code operable to detect resources within information handling system 100, to provide drivers for the resources, initialize the resources, to access the resources, and to support execution of the at least one application 132. Operating system 134 has access to system elements via an operating system interface 136. Operating system interface 136 is connected to memory 130 via connection 138.

Battery management unit (BMU) 151 is connected to I/O interface 150 via battery management unit interface 155. BMU 151 is connected to battery 153 via connection 157. Operating system interface 136 has access to BMU 151 via connection 139, which is connected from operating system interface 136 to battery management unit interface 155.

Graphics interface 140, disk controller 160, and I/O interface 150 are connected to chipset 120 via interfaces that may be implemented, for example, using a Peripheral Component Interconnect (PCI) interface, a PCI-Extended (PCI-X) interface, a high-speed PCI-Express (PCIe) interface, another industry standard or proprietary communication interface, or a combination thereof. Chipset 120 can also include one or more other I/O interfaces, including an Industry Standard Architecture (ISA) interface, a Small Computer Serial Interface (SCSI) interface, an Inter-Integrated Circuit (I$^2$C) interface, a System Packet Interface (SPI), a Universal Serial Bus (USB), another interface, or a combination thereof.

Disk controller 160 is connected to chipset 120 via connection 116. Disk controller 160 includes a disk interface 162 that connects the disc controller to a hard disk drive (HDD) 164, to an optical disk drive (ODD) 166, and to disk emulator 180. An example of disk interface 162 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 180 permits a solid-state drive 184 to be connected to information handling system 100 via an external interface 182. An example of external interface 182 includes a USB interface, an IEEE 1194 (Firewire) interface, a proprietary interface, or a combination thereof. Alternatively, solid-state drive 184 can be disposed within information handling system 100.

I/O interface 150 is connected to chipset 120 via connection 166. I/O interface 150 includes a peripheral interface 152 that connects the I/O interface to an add-on resource 154, to platform fuses 156, and to a security resource 158. Peripheral interface 152 can be the same type of interface as connects graphics interface 140, disk controller 160, and I/O interface 150 to chipset 120, or can be a different type of interface. As such, I/O interface 150 extends the capacity of such an interface when peripheral interface 152 and the I/O channel are of the same type, and the I/O interface translates information from a format suitable to such an interface to a format suitable to the peripheral channel 152 when they are of a different type. Add-on resource 154 can include a data storage system, an additional graphics interface, a network interface card (NIC), a sound/video processing card, another add-on resource, or a combination thereof. As an example, add-on resource 154 is connected to data storage system 190 via data storage system interface 192. Add-on resource 154 can be on a main circuit board, on separate circuit board or add-in card disposed within information handling system 100, a device that is external to the information handling system, or a combination thereof.

Network interface 170 represents a NIC disposed within information handling system 100, on a main circuit board of the information handling system, integrated onto another component such as chipset 120, in another suitable location, or a combination thereof. Network interface 170 is connected to I/O interface 150 via connection 174. Network interface device 170 includes network channel 172 that provides an interface to devices that are external to information handling system 100. In a particular embodiment, network channel 172 is of a different type than peripheral channel 152 and network interface 170 translates information from a format suitable to the peripheral channel to a format suitable to external devices. An example of network channels 172 includes InfiniBand channels, Fibre Channel channels, Gigabit Ethernet channels, proprietary channel architectures, or a combination thereof. Network channel 172 can be connected to external network resources (not illustrated). The network resource can include another information handling system, a data storage system, another network, a grid management system, another suitable resource, or a combination thereof.

Complex programmable logic device (CPLD) 121 is connected to chipset 120 via connections 128. Basic input/output system (BIOS) serial peripheral interface (SPI) flash memory 127 is connected to chipset 120 via connection 196. Baseboard management controller (BMC) 123 is connected to chipset 120 via connections 129. BMC embedded multimedia memory card (eMMC) memory 124 is connected to BMC 123 via connection 193. BMC SPI flash memory 125 is connected to BMC 123 via connection 194. Slave attached flash sharing (SAFS) SPI flash memory 126 is connected to BMC 123 via connection 195.

Figure 2:
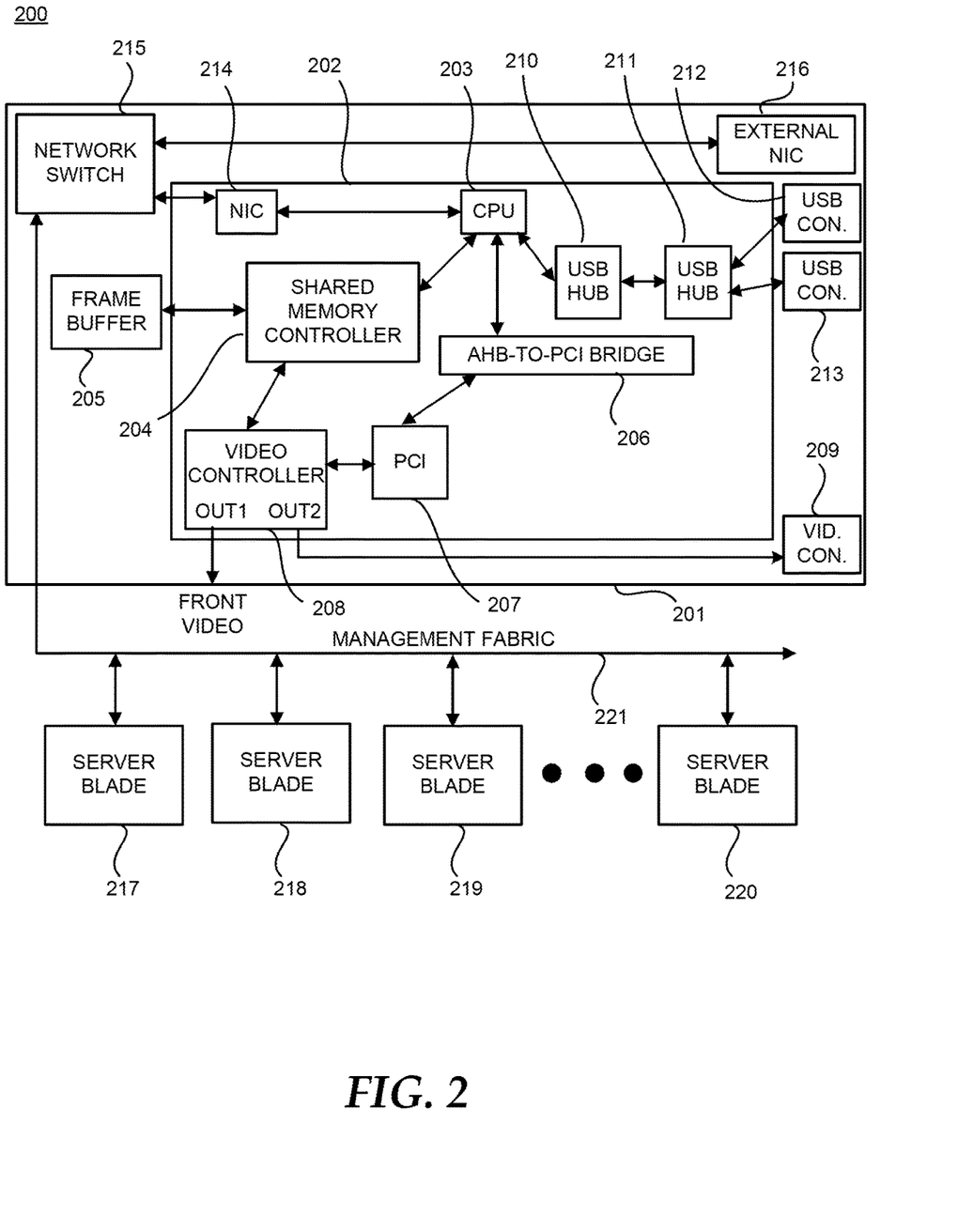
FIG. 2 is a block diagram illustrating an apparatus comprising an enclosure controller and a plurality of server blades according to an embodiment of the present disclosure.

FIG. 2 is a block diagram illustrating an apparatus comprising an enclosure controller and a plurality of server blades according to an embodiment of the present disclosure. Apparatus 200 comprises enclosure controller 201 and a plurality of server blades 217-220. FIG. 2 shows an exemplary embodiment of enclosure controller 201. Enclosure controller 201 comprises a system-on-chip (SoC) 202. SoC 202 comprises a central processing unit (CPU) 203, a shared memory controller 204, an advanced microcontroller bus architecture (AMBA) high-performance bus (AHB)-to-peripheral component interconnect (PCI) (AHB-to-PCI) bridge 206, a PCI 207, a video controller 208, a universal serial bus (USB) hub 210, a USB hub 211, and a network interface card (NIC) 214. Enclosure controller 201 also comprises frame buffer 205, video connector (e.g., 15-pin D-shell connector) 209, USB connector 212, USB connector 213, network switch 215, and external NIC 216. CPU 203 is connected to shared memory controller 204. Shared memory controller is connected to frame buffer 205. Shared memory connector 204 is connected to video controller 208. CPU 203 is connected to AHB-to-PCI bridge 206. AHB-to-PCI bridge 206 is connected to PCI 207. PCI 207 is connected to video controller 208. Video controller 208 has a first video output interface OUT1 connected to a front video output.

Video controller 208 has a second video output interface OUT2 connected to video connector 209.

CPU 203 is connected to USB hub 210. USB hub 210 is connected to USB hub 211. USB hub 211 is connected to USB connector 212 and to USB connector 213. CPU 203 is connected to NIC 214. NIC 214 is connected to network switch 215. Network switch 215 is connected to external NIC 216. Network switch 215 is connected to a management fabric 221, which is connected to blade servers 217-220.

Figure 3:
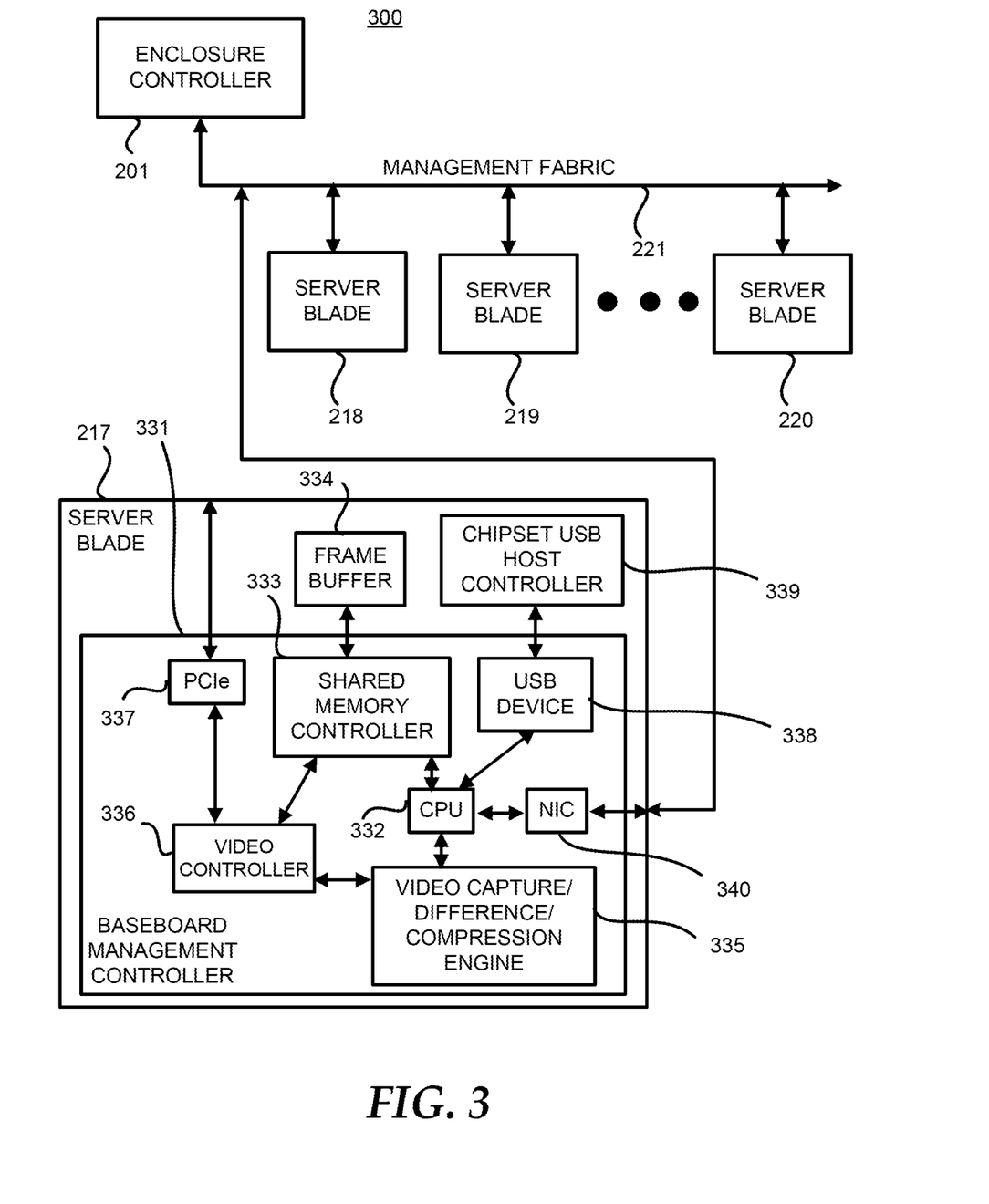
FIG. 3 is a block diagram illustrating an apparatus comprising an enclosure controller and a plurality of server blades according to an embodiment of the present disclosure.

FIG. 3 is a block diagram illustrating an apparatus comprising an enclosure controller and a plurality of server blades according to an embodiment of the present disclosure. Apparatus 300 comprises enclosure controller 201 and a plurality of server blades 217-220. FIG. 3 shows an exemplary embodiment of server blade 217. Enclosure controller 201 is connected to management fabric 221. Management fabric 221 is connected to server blades 217-220. Server blade 217 comprises baseboard management controller (BMC) 331. BMC 331 comprises CPU 332, shared memory controller 333, video capture/difference/compression engine 335, video controller 336, peripheral component interconnect express (PCIe) 337, USB device 338, and NIC 340.

Server blade 217 also comprises frame buffer 334 and chipset USB host controller 339. CPU 332 is connected to shared memory controller 333. Shared memory controller 333 is connected to frame buffer 334. Shared memory controller 333 is connected to video controller 336. CPU 332 is connected to video capture/difference/compression engine 335. Video capture/difference/compression engine 335 is connected to video controller 336. Video controller 336 is connected to PCIe 337. PCIe 337 can be used to connect external devices to server blade 217 via an external PCIe connection. CPU 332 is connected to USB device 338. USB device 338 is connected to chipset USB host controller 339. CPU 332 is connected to NIC 340. NIC 340 is connected to management fabric 221.

Figure 4:
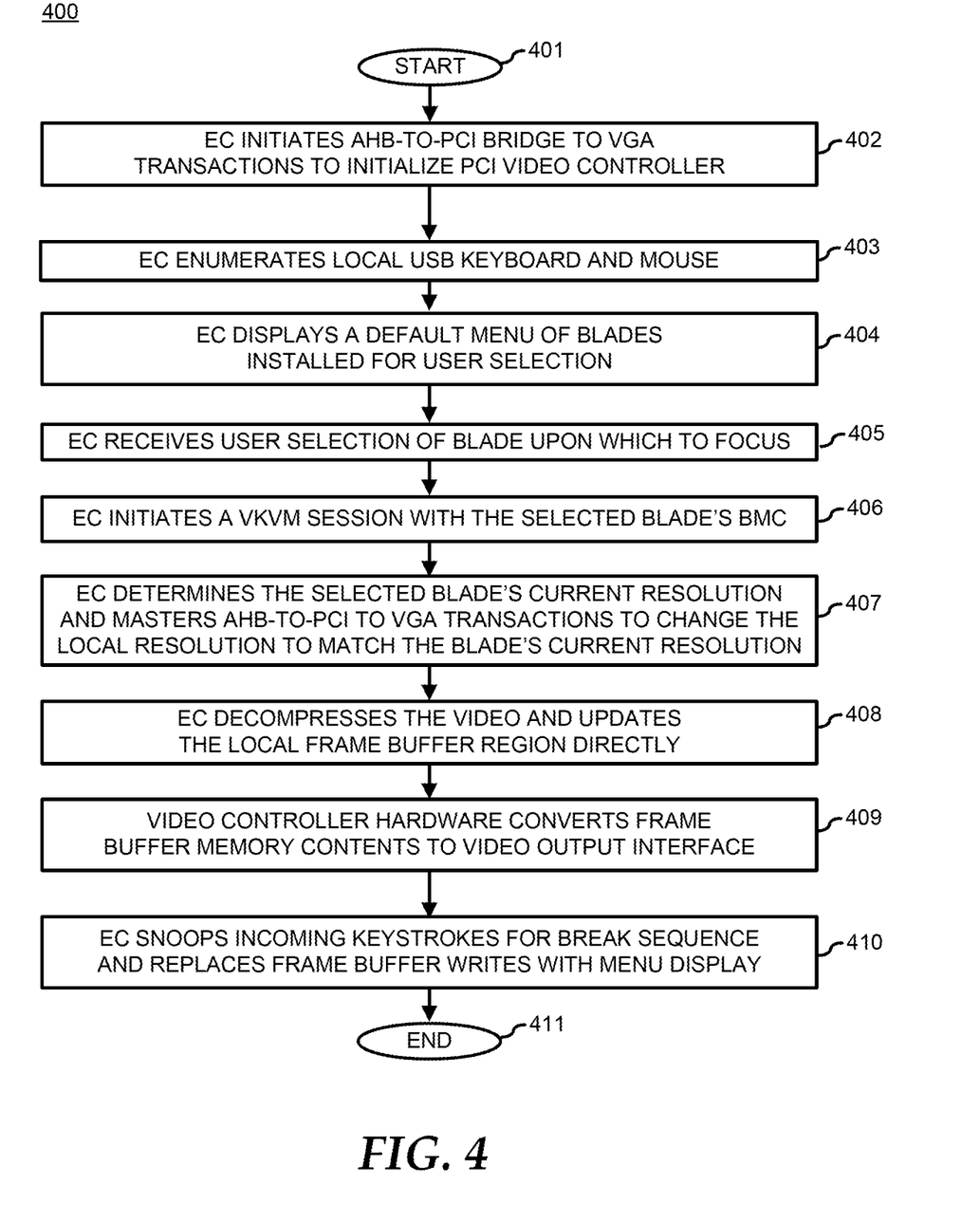
FIG. 4 is a flow diagram illustrating a method performed by an enclosure controller according to an embodiment of the present disclosure.

FIG. 4 is a flow diagram illustrating a method performed by an enclosure controller according to an embodiment of the present disclosure. Method 400 begins in block 401. From block 401, method 400 continues to block 402. In block 402, the enclosure controller initiates AHB-to-PCI bridge to video graphics adapter (VGA) transactions to initialize a PCI video controller. From block 402, method 400 continues to block 403. In block 403, the enclosure controller enumerates a local USB keyboard and mouse. From block 403, method 400 continues to block 404. In block 404, the enclosure controller displays a default menu of server blades installed from which a user may make a user selection. From block 404, method 400 continues to block 405. In block 405, the enclosure controller receives a user selection of a server blade upon which to focus. From block 405, method 400 continues to block 406. In block 406, the enclosure controller initiates a virtual keyboard, video, and mouse (VKVM) session with the selected server blade's baseboard management controller (BMC). From block 406, method 400 continues to block 407. In block 407, the enclosure controller determines the selected blade's current resolution and masters AHB-to-PCI to VGA transactions to change the local resolution to match the blade's current resolution. From block 407, method 400 continues to block 408. In block 408, the enclosure controller decompresses the video and updates the local frame buffer region directly. From block 408, method 400 continues to block 409. In block 409, the video controller hardware converts the frame buffer memory contents to a video output interface. As one example, the video output interface may be an analog video output interface. As an example, a digital-to-analog (DAC) converter may be used to convert digital information stored as frame buffer memory contents to an analog video output interface. As an example, the analog video output interface may be a VGA analog video output interface. As another example, the video output interface may be a digital video output interface. As examples, a digital video output interface may be a high definition multimedia interface (HDMI) or a Video Electronics Standards Association (VESA) DisplayPort digital video output interface.

From block 409, method 400 continues to block 410. In block 410, the enclosure controller monitors (e.g., "snoops") incoming keystrokes for a break sequence. If the break sequence is observed, the enclosure controller keeps the session open but replaces the frame buffer writes with a menu display. If user selection of the same server blade is received, the enclosure controller removes the menu display, which is overlaid over existing video of the selected server blade, and restores the video of the selected server blade without the menu display overlay. If user selection of an alternate server blade is received, the enclosure controller terminates the existing session and starts a new session for the alternate server blade. If the enclosure controller does not receive a user selection within a prescribed time period (e.g., one minute), the enclosure controller terminates the existing session. From block 410, method 400 continues to block 411, where it ends.

Figure 5:
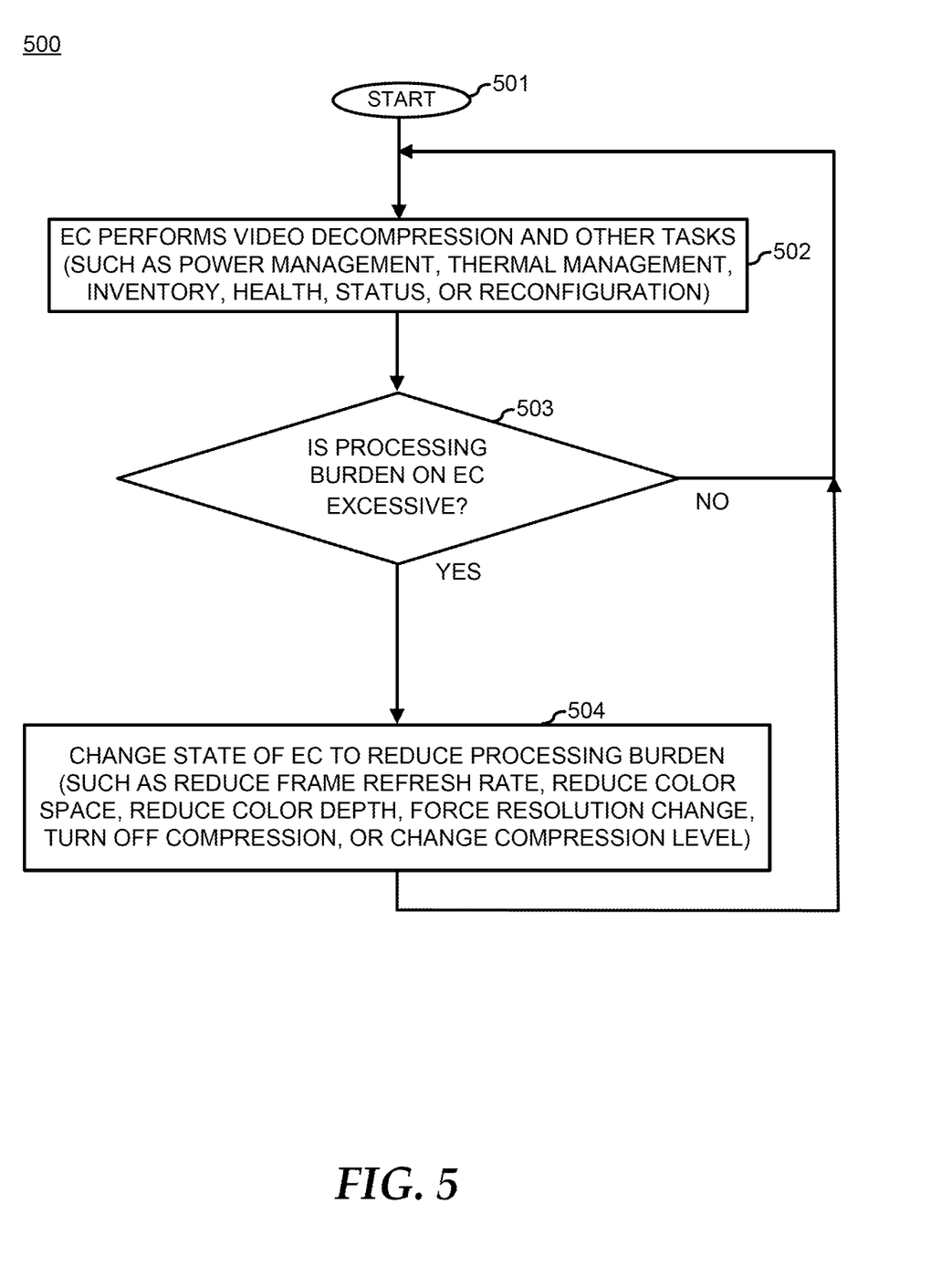
FIG. 5 is a flow diagram illustrating a method for managing a processing burden of an enclosure controller according to an embodiment of the present disclosure.

FIG. 5 is a flow diagram illustrating a method for managing a processing burden of an enclosure controller according to an embodiment of the present disclosure. Method 500 begins in block 501. From block 501, method 500 continues to block 502. In block 502, the enclosure controller performs video decompression and other tasks. Such other tasks may include, for example, power management, thermal management, inventory, health monitoring, status monitoring, reconfiguration, or combinations thereof. From block 502, method 500 continues to decision block 503. In decision block 503, a decision is made as to whether or not the processing burden on the enclosure controller is excessive. If not, method 500 returns to block 502. If so, method 500 continues to block 504. In block 504, the enclosure controller changes its state to reduce its processing burden. As examples, the enclosure controller may reduce its frame refresh rate, reduce its color space, reduce its color depth, force a resolution change, turn off video compression, or change the video compression level. From block 504, method 500 returns to block 502.

In accordance with at least one embodiment, a method comprises initiating advanced microcontroller bus architecture (AMBA) high-performance bus (AHB)-to-peripheral component interconnect (PCI) (AHB-to-PCI) to video graphics adapter (VGA) transactions to initialize a PCI video controller, receiving a user selection of a server module upon which to focus among a plurality of server modules, initiating a virtual keyboard, video, and mouse (VKVM) session with a baseboard management controller (BMC) of the server module, determining a current video resolution of the server module, mastering AHB-to-PCI to VGA transactions to change a local resolution to match the current video resolution of the server module, decompressing video data to obtain decompressed video data, and updating a local frame buffer region with the decompressed video data. In accordance with at least one embodiment, the method further comprises monitoring incoming keystrokes for a break sequence, and, when the break sequence is detected, replacing frame buffer write data with a menu display. In accordance with at least one embodiment, the replacing the frame buffer write data with the menu display comprises overlaying the menu display over server module video data. In accordance with at least one embodiment, the method further comprises enumerating a local universal serial bus (USB) keyboard and a local USB mouse. In accordance with at least one embodiment, the method further comprises displaying, at a commonly compatible resolution compatible with each of the plurality of server modules, a menu of the plurality of server modules available for user selection. In accordance with at least one embodiment, the displaying, at the commonly compatible resolution compatible with each of the plurality of server modules, the menu of the plurality of server modules available for the user selection comprises displaying the menu to include server module slot numbers, server module names, and server module service tag information. In accordance with at least one embodiment, the method further comprises monitoring the processing burden of an enclosure controller processor, wherein the enclosure controller processor performs the method, and reducing the processing burden on the enclosure controller processor by simplifying video processing operations performed by the enclosure controller processor when the processing burden is determined to be excessive.

In accordance with at least one embodiment, an information handling system comprises a plurality of server modules and an enclosure controller connected to the plurality of server modules and having an enclosure controller processor for obtaining server module video data from a server module of the plurality of server modules. The enclosure controller is for providing the server module video data for display. At least one parameter of the server module video data is modified to simplify processing of the server module video data in response to detection of an excessive processing burden of the enclosure controller processor. In accordance with at least one embodiment, the at least one parameter is selected from a group consisting of a video frame refresh rate, a video color space, a video color depth, a video resolution, a video compression level, and a video compression enablement. In accordance with at least one embodiment, the enclosure controller initiates a virtual keyboard, video, and mouse (VKVM) session with a baseboard management controller (BMC) of the server module. In accordance with at least one embodiment, the enclosure controller comprises an advanced microcontroller bus architecture (AMBA) high-performance bus (AHB)-to-peripheral component interconnect (PCI) (AHB-to-PCI) bridge to bridge server module video data from an AHB to a PCI video controller. In accordance with at least one embodiment, the enclosure controller monitors keystrokes for a break sequence and, in response to detecting the break sequence, replaces frame buffer write data with a menu display. In accordance with at least one embodiment, the menu display is overlaid over the server module video data. In accordance with at least one embodiment, the menu display provides for user selection of any of the plurality of server modules to provide the server module video data.

In accordance with at least one embodiment, a method comprises obtaining, at an enclosure controller connected to a plurality of server modules, server module video data from a server module of the plurality of server modules, performing, by the enclosure controller, video decompression of the server module video data to obtain decompressed server module video data, providing, by the enclosure controller, the decompressed server module video data for display, determining if a processing burden of an enclosure controller processor of the enclosure processor is excessive, and, in response to determining the processing burden of the enclosure controller processor to be excessive, changing a state of the enclosure controller to reduce to the processing burden of the enclosure controller processor. In accordance with at least one embodiment, the changing the state of the enclosure controller comprises modifying a parameter selected from group consisting of a video frame refresh rate, a video color space, a video color depth, a video resolution, a video compression level, and a video compression enablement. In accordance with at least one embodiment, the method further comprises initiating, by the enclosure controller, a virtual keyboard, video, and mouse (VKVM) session with a baseboard management controller (BMC) of the server module. In accordance with at least one embodiment, the method further comprises bridging server module video data from an AHB to a PCI video controller using an advanced microcontroller bus architecture (AMBA) high-performance bus (AHB)-to-peripheral component interconnect (PCI) (AHB-to-PCI) bridge. In accordance with at least one embodiment, the method further comprises monitoring, by the enclosure controller, keystrokes for a break sequence and, in response to detecting the break sequence, replacing frame buffer write data with a menu display. In accordance with at least one embodiment, the method further comprises overlaying the menu display over the server module video data, wherein the menu display provides for user selection of any of the plurality of server modules to provide the server module video data.

In accordance with at least one embodiment, a modular system is virtual to a local keyboard, video, and mouse (KVM) apparatus in a constrained embedded environment. The constrained embedded environment is constrained by limited computing resources, for example, a limited processing capability of an embedded processor that serves as an enclosure controller processor. Such limited computing resources have prevented computationally difficult real-time tasks, such as video processing, from being performed in such a context. The use of dedicated video paths, such as analog video lines, has limited the range of server modules for which a KVM capability could be provided, for example, to only server modules within a particular server chassis. By utilizing a network interface to server module baseboard management controllers (BMCs), an enclosure controller is able to discover and make available previews and KVM focus to a deep tier of servers, for example, in other locations across the world.

In accordance with at least one embodiment, the enclosure controller (EC), which may, for example, be implemented as a chassis management controller (CMC), contains a CPU to video controller path and CPU direct access to the video frame buffer. The EC firmware initializes the video controller, manages an on screen display, including selections and previews, and performs virtual KVM sessions with authentication over the internal management network to many servers. The EC then decompresses the video for the selected server and writes the uncompressed frames into the frame buffer for local front/rear rendering (e.g., rendering video to be provided to either or both of a front video output port and a rear video output port). Methods are described related to ensuring that the computing load is not persistently excessive, thereby interfering with other embedded management operations. More functionality is described related to previews and selections for server modules within the local chassis and foreign chassis. By using network-based distribution of server module video data from the plurality of server modules to the EC, the server modules need not be located only in a local chassis, but may also be located in a foreign chassis separate and apart from a local chassis proximate to the EC.

In accordance with at least one embodiment, an enclosure controller provides video controller initialization, inclusive of resolution, via an AHB to PCI bridge. Such video controller initialization can be configured to mimic a host video option read-only memory (Option ROM) sequence. In accordance with at least one embodiment, the enclosure controller provides frame buffer initialization. In accordance with at least one embodiment, the enclosure controller directly enumerates chassis level USB-based keyboard/mouse and USB media devices. In accordance with at least one embodiment, the enclosure controller draws an on-screen display (OSD) that utilizes keyboard/mouse that includes a preview screen shot and selections for the video output of each of the following: upon user selection, the EC initiates a KVM viewer session to that server's BMC utilizing existing methods such as java web start plugin applet service; the applet's output, which is uncompressed video, gets copied by the CPU via a shared memory controller with the EC's operating system; and the EC's detection of locally attached keyboard or mouse in the OSD menu interact with the menus. When a selection is made, then the keyboard and mouse get redirected to over the KVM over IP session to the KVM focus selected server.

In accordance with at least one embodiment, the enclosure controller dynamically reconfigures the video controller to support alternate video resolutions as needed by the server's local video controller. In accordance with at least one embodiment, the enclosure controller provides virtual media support. If a storage media device is detected in the system (such as DVD-ROM) or in an external port (such as a USB key), the on-screen display provided user selection to assign the media device to a particular server. Storage assignment is independent of the KVM focus. When selected, the EC initiates a virtual media connection to the selected server (e.g., no credentials are required when initiated from the EC on the internal VLAN since the EC is a trusted client). In accordance with at least one embodiment, the enclosure controller initiates a Serial-over-LAN or SSH session to the selected server while redirecting out the text and background to the video frame buffer for local display and taking keyboard inputs to direct to the Serial-over-LAN or SSH session. In accordance with at least one embodiment, the enclosure controller provides a screen that utilizes asset location techniques aiding in physical location of the servers in the KVM and media menu.

The network-based KVM capability extends the possibilities for remote system administration. Since the EC can communicate with ECs in other chassis and this functionality is provided over a management network, then the selection screen for KVM and media redirection can extend beyond the local chassis servers to other servers in other chassis within the same logical grouping or on the same management network. The EC can provide a remote user with an ability to view and interact with the same on-screen display rendered in the EC web GUI. When selections are made, the client to BMC vKVM session is created, which bypasses the EC's involvement. This is accomplished by the EC serving up the KVM viewer that includes the external IP of the selected server. The EC can extend the local KVM reach. Since the proposed solution utilizes the network interface to the server module BMCs, an EC can discover and make available previews and KVM focus to a deep tier of servers in other locations, for example, across the world.

Even though an enclosure controller processor, such as one using a SoC, may be highly capable in the context of embedded systems, it remains a resource-constrained environment compared to a PC and can have hundreds of other responsibilities, some of which are real time in nature and some of which are visible to a user. In accordance with at least one embodiment, the enclosure controller dedicates one of the main CPU cores solely to the KVM and media task with respective APIs to the main processor. In accordance with at least one embodiment, the enclosure controller utilizes an embedded KVM viewer process performance monitor application which monitors the CPU load of the KVM viewer, which can spike with heavy server video changes. If the CPU load is seen to spike high for a configurable but relatively long period (e.g., 20 seconds) while other high priority processes are also observed to be demanding relatively high, then tell the KVM viewer to modify its settings to reduce the CPU load through means such as reduced color depth, reduced refresh rate, and reduced compression levels (less software decompression time).

While embodiments have been described herein with respect to specific types of interfaces, such as AHB, PCI, PCIe, USB, and VGA, other embodiments may be applied to other types of interfaces. For example, if it is desirable to provide other or additional types of interfaces, an embodiment using such other or additional types of interfaces may be implemented in accordance with the disclosure herein.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality.

The information handling system can include memory (volatile (such as random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
   a plurality of server modules; and
   an enclosure controller connected to the plurality of server modules and having an enclosure controller processor for obtaining server module video data from a server module of the plurality of server modules, the enclosure controller configured to receive a user selection of the server module among the plurality of server modules, to determine a current video resolution of the server module, and to master advanced microcontroller bus architecture (AMBA) high-performance bus (AHB)-to-peripheral component interconnect (PCI) (AHB-to-PCI) to video graphics adapter (VGA) transactions to change a local resolution to match the current video resolution of the server module, the enclosure controller for providing the server module video data for display by updating a local frame buffer region with decompressed video data, wherein at least one parameter of the server module video data is modified to simplify processing of the server module video data in response to detection for a configurable period of an excessive processing burden of the enclosure controller processor, the enclosure controller configured to perform tasks comprising video decompression, power management, and thermal management.

2. The information handling system of claim 1 wherein the at least one parameter is selected from a group consisting of:
   a video frame refresh rate;
   a video color space;
   a video color depth;
   a video resolution;
   a video compression level; and
   a video compression enablement.

3. The information handling system of claim 1 wherein the enclosure controller initiates a virtual keyboard, video, and mouse (VKVM) session with a baseboard management controller (BMC) of the server module.

4. The information handling system of claim 1 wherein the enclosure controller comprises:
   an advanced microcontroller bus architecture (AMBA) high-performance bus (AHB)-to-peripheral component interconnect (PCI) (AHB-to-PCI) bridge to bridge server module video data from an AHB to a PCI video controller, wherein the enclosure controller is configured to initialize the PCI video controller via the AHB-to-PCI bridge.

5. The information handling system of claim 1 wherein the enclosure controller monitors keystrokes for a break sequence and, in response to detecting the break sequence, replaces frame buffer write data with a menu display.

6. The information handling system of claim 5 wherein the menu display is overlaid over the server module video data.

7. The information handling system of claim 6 wherein the menu display provides for user selection of any of the plurality of server modules to provide the server module video data.

8. A method comprising:
   receiving, at an enclosure controller connected to a plurality of server modules, a user selection of a server module among the plurality of server modules;
   obtaining, at the enclosure controller, server module video data from the server module of the plurality of server modules;
   determining, at the enclosure controller, a current video resolution of the server module;
   mastering, at the enclosure controller, advanced microcontroller bus architecture (AMBA) high-performance bus (AHB)-to-peripheral component interconnect (PCI) (AHB-to-PCI) to video graphics adapter (VGA)

transactions to change a local resolution to match the current video resolution of the server module;

performing, by the enclosure controller, video decompression of the server module video data to obtain decompressed server module video data;

performing, by the enclosure controller, power management;

performing, by the enclosure controller, thermal management;

providing, by the enclosure controller, the decompressed server module video data for display;

determining if a processing burden of an enclosure controller processor of the enclosure processor is excessive for a configurable period; and in response to determining the processing burden of the enclosure controller processor to be excessive, changing a state of the enclosure controller to reduce to the processing burden of the enclosure controller processor, wherein providing the decompressed server module video data for display includes updating a local frame buffer region with the decompressed video data.

9. The method of claim 8 wherein the changing the state of the enclosure controller comprises:
modifying a parameter selected from group consisting of a video frame refresh rate, a video color space, a video color depth, a video resolution, a video compression level, and a video compression enablement.

10. The method of claim 8 further comprising:
initiating, by the enclosure controller, a virtual keyboard, video, and mouse (VKVM) session with a baseboard management controller (BMC) of the server module.

11. The method of claim 10 further comprising:
bridging server module video data from an AHB to a PCI video controller using an advanced microcontroller bus architecture (AMBA) high-performance bus (AHB)-to-peripheral component interconnect (PCI) (AHB-to-PCI) bridge, wherein the enclosure controller is configured to initialize the PCI video controller via the AHB-to-PCI bridge.

12. The method of claim 11 further comprising:
monitoring, by the enclosure controller, keystrokes for a break sequence and, in response to detecting the break sequence, replacing frame buffer write data with a menu display.

13. The method of claim 8 further comprising:
overlaying the menu display over the server module video data, wherein the menu display provides for user selection of any of the plurality of server modules to provide the server module video data.

14. A method comprising:
initiating advanced microcontroller bus architecture (AMBA) high-performance bus (AHB)-to-peripheral component interconnect (PCI) (AHB-to-PCI) to video graphics adapter (VGA) transactions to initialize a PCI video controller;

receiving, at an enclosure controller connected to a plurality of server modules, a user selection of a server module upon which to focus among a the plurality of server modules;

initiating a virtual keyboard, video, and mouse (VKVM) session with a baseboard management controller (BMC) of the server module;

obtaining, at the enclosure controller, server module video data from the server module of the plurality of server modules;

determining, at the enclosure controller, a current video resolution of the server module;

mastering, at the enclosure controller, AHB-to-PCI to VGA transactions to change a local resolution to match the current video resolution of the server module;

decompressing, by the enclosure controller, server module video data to obtain decompressed server module video data; and performing, by the enclosure controller, power management;

performing, by the enclosure controller, thermal management;

providing, by the enclosure controller, the decompressed server module video data for display;

determining if a processing burden of an enclosure controller processor of the enclosure processor is excessive for a configurable period; and in response to determining the processing burden of the enclosure controller processor to be excessive, changing a state of the enclosure controller to reduce to the processing burden of the enclosure controller processor, wherein providing the decompressed server module video data for display includes updating a local frame buffer region with the decompressed server module video data.

15. The method of claim 14 further comprising:
monitoring incoming keystrokes for a break sequence; and when the break sequence is detected, replacing frame buffer write data with a menu display.

16. The method of claim 15 wherein the replacing the frame buffer write data with the menu display comprises:
overlaying the menu display over the decompressed server module video data.

17. The method of claim 14 further comprising:
enumerating a local universal serial bus (USB) keyboard and a local USB mouse.

18. The method of claim 14 further comprising:
displaying, at a commonly compatible resolution compatible with each of the plurality of server modules, a menu of the plurality of server modules available for user selection.

19. The method of claim 18 wherein the displaying, at the commonly compatible resolution compatible with each of the plurality of server modules, the menu of the plurality of server modules available for the user selection comprises:
displaying the menu to include server module slot numbers, server module names, and server module service tag information.

20. The method of claim 14 further comprising:
monitoring the processing burden of an enclosure controller processor, wherein the enclosure controller processor performs the method; and reducing the processing burden on the enclosure controller processor by simplifying video processing operations performed by the enclosure controller processor when the processing burden is determined to be excessive.

* * * * *